United States Patent
Oka et al.

(10) Patent No.: US 6,192,437 B1
(45) Date of Patent: Feb. 20, 2001

(54) TRANSMISSION APPARATUS WITH CONTROL CIRCUIT/RELAY WITHIN EACH CARD PROVIDING CONNECTION TO RELATED CARD OUTPUT DEPENDING ON RELATED SLOT ID/ REDUNDANCY/NON-REDUNDANCY, WORKING/PROTECTION SIGNALS

(75) Inventors: Akihiko Oka; Keiichiro Tsukamoto, both of Kawasaki (JP)

(73) Assignee: Fujitsu Limited, Kawasaki (JP)

(*) Notice: Under 35 U.S.C. 154(b), the term of this patent shall be extended for 0 days.

(21) Appl. No.: 09/375,298

(22) Filed: Aug. 16, 1999

(30) Foreign Application Priority Data

Feb. 18, 1999 (JP) .................................................. 11-039383

(51) Int. Cl.[7] ............................ G06F 13/10; G06F 13/00; G06F 1/24; G06F 9/00; H04L 1/22

(52) U.S. Cl. .............................. 710/104; 710/36; 710/38; 710/100; 710/102; 714/1; 714/7; 714/11; 714/13; 711/162; 711/165; 711/166; 713/100

(58) Field of Search .................... 710/36, 38, 100, 710/101, 102, 103, 104; 711/1, 161, 162, 165, 166; 713/100; 714/1, 6, 7, 8, 11, 13, 710

(56) References Cited

U.S. PATENT DOCUMENTS

| | | | |
|---|---|---|---|
| 5,136,498 | * | 8/1992 | McLaughlin et al. ................ 364/184 |
| 5,202,822 | * | 4/1993 | McLaughlin et al. ................ 364/187 |
| 5,255,388 | * | 10/1993 | McLaughlin et al. ................ 395/600 |
| 5,508,910 | * | 4/1996 | Diehl .................................... 364/187 |
| 5,655,149 | * | 8/1997 | Muegge et al. ....................... 395/830 |
| 5,997,166 | * | 12/1999 | Flood .................................... 364/131 |
| 6,085,333 | * | 7/2000 | DeKoning et al. ....................... 714/7 |

FOREIGN PATENT DOCUMENTS 5-191389    7/1993   (JP) .

* cited by examiner

Primary Examiner—Thomas C. Lee
Assistant Examiner—Tanh Nguyen
(74) Attorney, Agent, or Firm—Helfgott & Karas, P.C.

(57) ABSTRACT

A transmission apparatus includes a shelf which includes a working card slot and a protection card slot, the working card slot supplying a first slot ID to a first card inserted in the working card slot, and the protection card slot supplying a second slot ID to a second card inserted in the protection card slot. A control logic circuit, provided within each of the first and second cards, receives one of the first slot ID or the second slot ID, a redundancy/non-redundancy R/N signal and a working/protection W/P signal, and outputs a control signal depending on the related slot ID, the R/N signal and the W/P signal. A line connection relay, provided within each of the first and second cards, connects either a working line or a protection line to an output of the related card in accordance with the control signal supplied by the control logic circuit.

8 Claims, 8 Drawing Sheets

FIG.5

| R/N SIGNAL | W/P SIGNAL | SLOT ID | CONTROL SIGNAL TO RELAY |
|---|---|---|---|
| N "1" | W "1" | SG "0" | ON |
|  | P "0" | SG "0" | ON |
|  | W "1" | OP "1" | OFF |
|  | P "0" | OP "1" | OFF |
| R "0" | W "1" | SG "0" | ON |
|  | P "0" | SG "0" | OFF |
|  | W "1" | OP "1" | OFF |
|  | P "0" | OP "1" | ON |

W "1"  : WORKING LINE
P "0"  : PROTECTION LINE
SG "0": W CARD SLOT (GROUND)
OP "1": P CARD SLOT (OPEN CIRCUIT)
N "1"  : NON-REDUNDANCY
R "0"  : REDUNDANCY
ON     : W LINE CONNECTED
OFF    : P LINE CONNECTED

TRANSMISSION APPARATUS WITH CONTROL CIRCUIT/RELAY WITHIN EACH CARD PROVIDING CONNECTION TO RELATED CARD OUTPUT DEPENDING ON RELATED SLOT ID/ REDUNDANCY/NON-REDUNDANCY, WORKING/PROTECTION SIGNALS

BACKGROUND OF THE INVENTION (1) Field of the Invention

The present invention relates to a transmission apparatus in which cards are inserted into slots of a shelf and either a redundancy configuration or a non-redundancy configuration is used.

A variety of transmission apparatuses employ either a redundancy configuration or a non-redundancy configuration. When the redundancy configuration is used, a working card and a protection card per channel are installed in the transmission apparatus. If the working card malfunctions, the working card is disconnected from a transmission line and the protection card is connected to the line, in order to provide reliability of data transmitted through the transmission apparatus. When the non-redundancy configuration is used, a single card per channel is installed in the transmission apparatus. The non-redundancy configuration is often used by transmission apparatuses which do not require high reliability of the data transmitted. It is desirable to suitably select the redundancy configuration or the non-redundancy configuration for each transmission apparatus in order to meet both the reliability and the cost efficiency.

(2) Description of the Related Art

FIG. 6 shows a conventional transmission apparatus with a working card connected to a transmission line.

In the conventional transmission apparatus of FIG. 6, a plurality of cards are inserted into slots of a shelf 51. A working card 52-1 and a protection card 52-2 are inserted in the slots of the shelf 51. The working card 52-1 contains a relay 53-1, and the relay 53-1 is switched as indicated by the dotted line in FIG. 6 so as to connect the working card 52-1 to a transmission line 55. The protection card 52-2 contains a relay 53-2, and the relay 53-2 is switched as indicated by the dotted line in FIG. 6 so as to connect the protection card 52-2 to an inactive line. The shelf 51 includes a selector switch 54 at the outputs of the slots, and the selector switch 54 is switched as indicated by the dotted line in FIG. 6 so as to connect the output of the working card 52-1 to an output transmission line.

With the arrangement of the conventional transmission apparatus shown in FIG. 6, a signal supplied via the transmission line 55 is processed by the working card 52-1, and the processed signal is delivered from the working card 52-1 to the output transmission line. The working card 52-1 and the protection card 52-2 are usually configured in the form of a module of electronic parts fabricated on a printed circuit board. Alternatively, these cards may be called boards or units.

If the working card 52-1 in the above-mentioned apparatus malfunctions, the switching of the relays 53-1 and 53-2 and the switch 54 is changed to disconnect the working card 52-1 from the transmission line 55 and connect the protection card 52-2 to the transmission line 55.

FIG. 7 shows the conventional transmission apparatus with the protection card 52-2 connected to the transmission line 55.

As shown in FIG. 7, the relay 53-1 is switched as indicated by the dotted line in FIG. 7 so as to disconnect the working card 52-1 from the transmission line 55 and connect the working card 52-1 to an inactive line. The relay 53-2 is switched as indicated by the dotted line in FIG. 7 so as to connect the protection card 52-2 to the transmission line 55. The selector switch 54 is switched as indicated by the dotted line in FIG. 7 so as to connect the output of the protection card 52-2 to the output transmission line. With the arrangement of the conventional transmission apparatus shown in FIG. 7, a signal supplied through the transmission line 55 to the shelf 51 is processed by the protection card 52-2, and the processed signal is delivered from the protection card 52-2 to the output transmission line.

FIG. 8 shows a redundancy configuration and a non-redundancy configuration of a conventional transmission apparatus. In FIG. 8, "W" indicates a working card inserted in the shelf, "P" indicates a protection card inserted in the shelf, and "C" indicates a control card inserted in the shelf.

As shown in FIG. 8, the shelf is divided into an upper segment with eleven slots and a lower segment with eleven slots. In the upper segment of the shelf, ten sets of working cards "W" and protection cards "P" and a control card "C" are inserted into the slots thereof. The working card "W" and the protection card "P" of each set are installed per channel. The upper segment uses the redundancy configuration. In the lower segment of the shelf, five working cards "W", a protection card "P" and a control card "C" are inserted into the slots thereof. Either of the working card "W" and the protection card "P" is installed per channel. The lower segment mainly uses the non-redundancy configuration.

When the redundancy configuration, such as that of the upper segment of FIG. 8, is used, it is possible to make effective use of the card slots of the shelf. However, when the non-redundancy configuration, such as that of the lower segment of FIG. 8, is used, the number of vacant slots for the protection cards is increased with increase of the working cards inserted in the shelf. It is difficult for the conventional transmission apparatus to effectively use the vacant slots for the protection cards of the shelf in the non-redundancy configuration.

In order to effectively use the vacant slots for the protection cards in the shelf of the conventional transmission apparatus in the non-redundancy configuration, the line connections of the relays of the cards to be inserted (and those of the adjacent cards already inserted) have to be set such that the transmission line is always connected to the cards inserted as shown in FIG. 7. Such setting of the line connections of the relays has been manually performed for each of the cards inserted in the shelf. Practically the setting of the line connections of the cards inserted needs complicated and time-consuming manipulations, and erroneous setting of the line connections of the cards inserted in the shelf is likely to occur.

SUMMARY OF THE INVENTION

An object of the present invention is to provide an improved transmission apparatus in which the above-mentioned problems are eliminated.

Another object of the present invention is to provide a transmission apparatus which can effectively use card slots of a shelf without increasing the number of vacant slots for the protection cards with increase of the working cards inserted in the shelf not only when the redundancy configuration is used but also when the non-redundancy configuration is used.

Still another object of the present invention is to provide a transmission apparatus which allows accurate setting of the line connections of the cards inserted in the shelf not only when the redundancy configuration is used but also when the non-redundancy configuration is used.

The above-mentioned objects of the present invention are achieved by a transmission apparatus in which a plurality of cards are inserted into a plurality of card slots, the transmission apparatus comprising: a shelf which includes a working card slot and a protection card slot, the working card slot supplying a first slot ID to a first card inserted in the working card slot, and the protection card slot supplying a second slot ID to a second card inserted in the protection card slot; a control logic circuit, provided within each of the first and second cards, which receives one of the first slot ID or the second slot ID, a redundancy/non-redundancy R/N signal and a working/protection W/P signal, and outputs a control signal depending on the related slot ID, the R/N signal and the W/P signal; and a line connection relay, provided within each of the first and second cards, which connects either a working line or a protection line to an output of the related card in accordance with the control signal supplied by the control logic circuit.

When the shelf is set in the non-redundancy configuration, the transmission apparatus of the present invention acts to connect the working line to the output of the card inserted in the working card slot and to connect the protection line to the output of the card inserted in the protection card slot. The transmission apparatus of the present invention is effective in preventing the increase in the number of vacant slots for the protection cards in the shelf of the non-redundancy configuration. Thus, it is possible to effectively use the card slots of the shelf even when it is set in the non-redundancy configuration.

The transmission apparatus of the present invention is effective in allowing accurate setting of the line connections of the cards inserted in the shelf not only when the redundancy configuration is used but also when the non-redundancy configuration is used. It is possible to provide good reliability of communications without causing the erroneous setting of the line connections of the cards inserted in the shelf.

BRIEF DESCRIPTION OF THE DRAWINGS

The above and other objects, features and advantages of the present invention will become more apparent from the following detailed description when read in conjunction with the accompanying drawings in which:

FIG. 5 is a diagram for explaining a relationship between setting signals input to the control logic circuit and a control signal output by the control logic circuit;

DETAILED DESCRIPTION OF THE PREFERRED EMBODIMENT

Before explaining the preferred embodiment of the present invention, a description will be given of the basic configuration of a transmission apparatus of the present invention with reference to FIG. 1 and FIG. 2, in order to facilitate understanding of the principles of the present invention.

Figure 1:
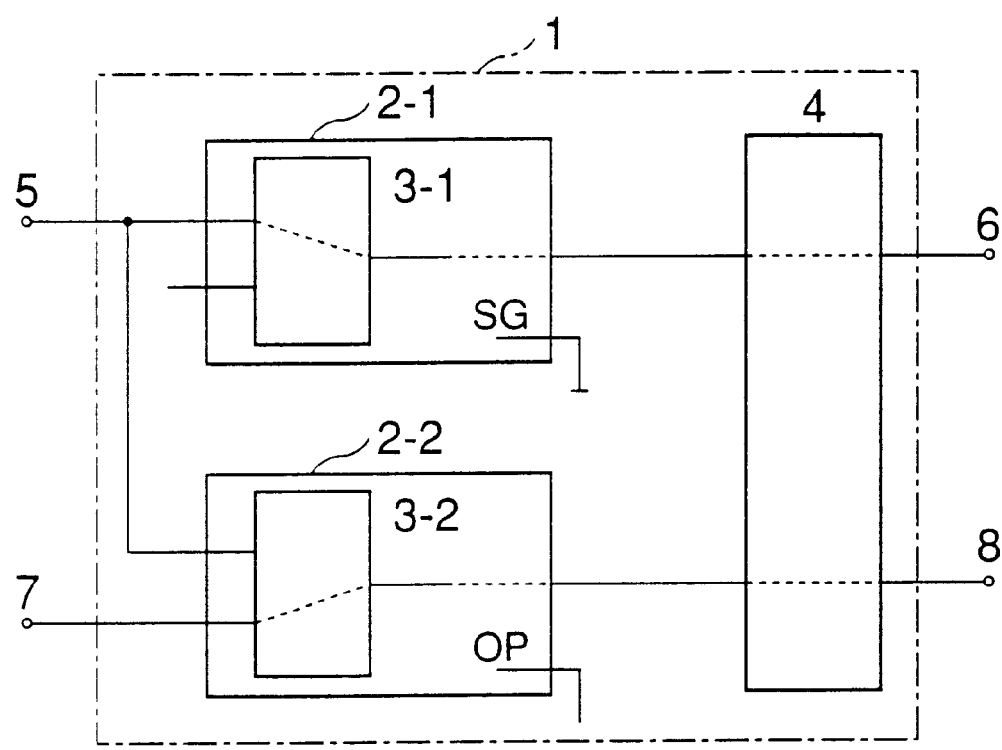
FIG. 1 is a diagram for explaining essential parts of a transmission apparatus of the present invention.

FIG. 1 shows the essential parts of the transmission apparatus of the present invention.

In the transmission apparatus of FIG. 1, a plurality of cards are inserted into slots of a shelf 1. For the sake of convenience, only the essential parts of the transmission apparatus are shown in FIG. 1. Input transmission line 5 and 6 are connected to inputs of the shelf 1, and outputs of the shelf 1 are connected to output transmission lines 6 and 8. A working card 2-1 and a protection card 2-2 are respectively inserted in a working card slot and a protection card slot of the shelf 1. The working card 2-1 contains a relay 3-1, and the relay 3-1 is switched as indicated by the dotted line in FIG. 1 so as to connect the working card 2-1 to the transmission line 5. The working card slot includes an active input through which the working card 2-1 is connected to the transmission line 5, and an inactive input which is not connected to any transmission line. The protection card 2-2 contains a relay 3-2, and the relay 3-2 is switched as indicated by the dotted line in FIG. 1 so as to connect the protection card 2-2 to the transmission line 7. The protection card slot includes an inactive input which is connected to the transmission line 5, and an active input through which the protection card 202 is connected to the transmission line 7.

The shelf 1 includes a selector switch 4 at the outputs of the slots, and the selector switch 4 is switched as indicated by the dotted line in FIG. 1 so as to connect the output of the working card 2-1 to the output transmission line 6 and connect the output of the protection card 2-2 to the output transmission line 8.

In the transmission apparatus of FIG. 1, the working card slot with the card 2-1 inserted includes a pin conductor (SG) which is grounded, and the protection card slot with the card 2-2 inserted includes a pin conductor (OP) which is in an open-circuit condition. The pin conductor (SG or OP) of each slot of the shelf 1 acts to supply a SLOT ID to the card inserted in that slot. In the example of FIG. 1, the card 2-1, when inserted in the working card slot, receives the SLOT ID (="0") from the pin conductor (SG) of the working card slot, and the card 2-2, when inserted in the protection card slot, receives the SLOT ID (="1") from the pin conductor (OP) of the protection card slot.

Figure 8:
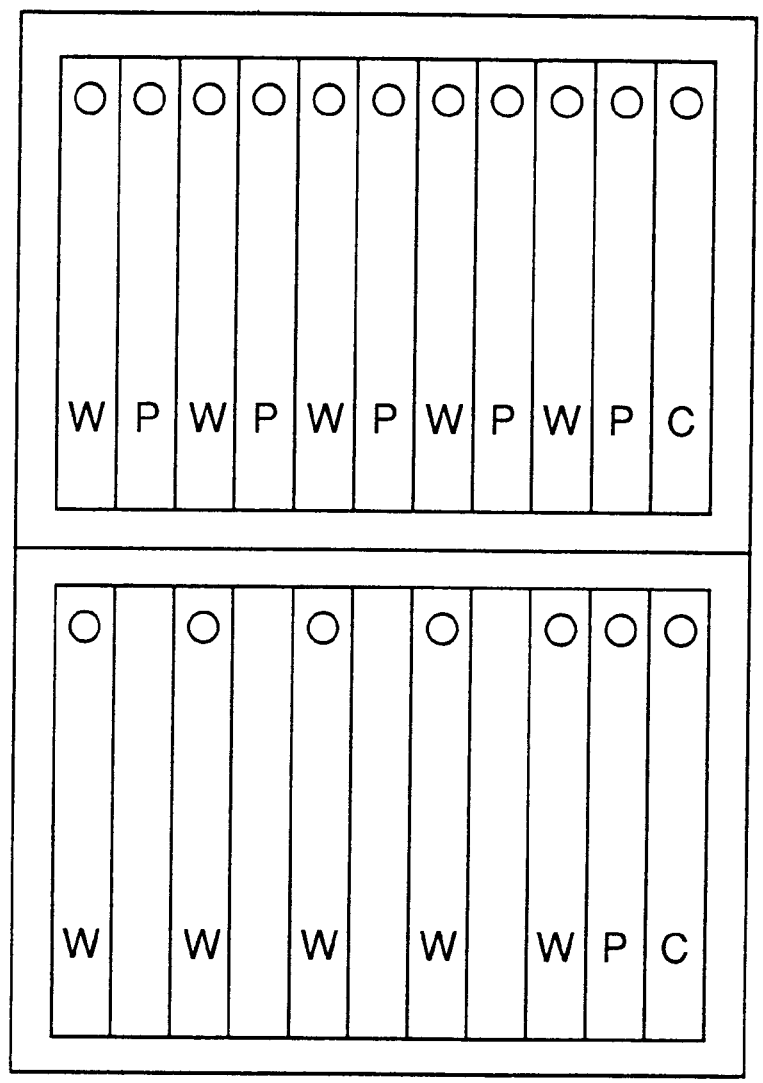
FIG. 8 is a diagram for explaining a redundancy configuration and a non-redundancy configuration of a conventional transmission apparatus.

The slots of the shelf 1 of the transmission apparatus of FIG. 1 may be arranged in a manner similar to those of the shelf of FIG. 8. Namely, a number of sets of the working card and the protection card are inserted in the plural slots of the shelf 1 although the indication of such plural slots is omitted in FIG. 1. The pin conductor (SG or OP) of each of the plural slots of the shelf 1 acts to supply the SLOT ID ("0" or "1") to the card inserted in that slot.

Alternatively, the SLOT ID may be constituted by a plurality of bits, and such SLOT ID may indicate a specific one of the plurality of slots of the shelf 1.

The transmission apparatus of the present invention supplies the SLOT ID, a redundancy/ non-redundancy (RIN)

signal, and a working/protection (W/P) signal to each of the working card 2-1 and the protection card 2-2 when the cards 2-1 and 2-2 are inserted into the shelf 1. The R/N signal indicates which of the redundancy (R) configuration and the non-redundancy (N) configuration is to be used by the shelf 1. The W/P signal indicates which of a working line and a protection line (which will be described later) is to be connected to the output of the card inserted in the slot.

In the transmission apparatus of FIG. 1, when the non-redundancy (N) configuration is used, the active input of the working card slot, connected to the transmission line 5, corresponds to the working line for the card 2-1, and the inactive input of the working card slot, not connected to any transmission line, corresponds to the protection line for the card 2-1. Further, when the non-redundancy (N) configuration is used, the inactive input of the protection card slot, connected to the transmission line 5, corresponds to the working line for the card 2-2, and the active input of the protection card slot, connected to the transmission line 7, corresponds to the protection line for the card 2-2. On the other hand, when the redundancy (R) configuration is used, the transmission lines 7 and 8 are inactive and only the transmission lines 5 and 6 are active. In this case, the active input of the working card slot, connected to the active transmission line 5, corresponds to the working line for the card 2-1, and the inactive input of the working card slot, not connected to any transmission line, corresponds to the protection line for the card 2-1. Further, when the redundancy (R) configuration is used, the inactive input of the protection card slot, connected to the active transmission line 5, corresponds to the working line for the card 2-2, and the active input of the protection card slot, connected to the inactive transmission line 7, corresponds to the protection line for the card 2-2.

When the R/N signal is set to indicate the N configuration being used, the card 2-1 inserted in the working card slot of the shelf 1 controls the relay 3-1 in accordance with the SLOT ID ("0") and the R/N signal ("N"), such that the card 2-1 is connected to the transmission line 5 (or to the active input of the working card slot) by the relay 3-1 as indicated by the dotted line in FIG. 1. The card 2-2 inserted in the protection card slot of the shelf 1 controls the relay 3-2 in accordance with the SLOT ID ("1") and the R/N signal ("N"), such that the card 2-2 is connected to the transmission line 7 (or to the active input of the protection card slot) by the relay 3-2 as indicated by the dotted line in FIG. 1. The selector switch 4 is switched as indicated by the dotted line in FIG. 1 so as to connect the output of the card 2-1 to the output transmission line 6 and connect the output of the card 2-2 to the output transmission line 8.

With the arrangement of the transmission apparatus of FIG. 1 in the case of the N configuration, a signal supplied via the transmission line 5 is processed by the card 2-1 and the processed signal is delivered from the card 2-1 to the output transmission line 6, while a signal supplied via the transmission line 7 is processed by the card 2-2 and the processed signal is delivered from the card 2-2 to the output transmission line 8. Hence, it is possible for the transmission apparatus of the present invention to eliminate the increase in the number of vacant slots in the shelf in the case of the non-redundancy configuration. The parallel processing of data signals supplied via the transmission lines 5 and 7 is always possible by the respective cards 2-1 and 2-2 inserted in the shelf 1 in the non-redundancy configuration.

When the R/N signal is set to indicate the redundancy (R) configuration being used, the transmission lines 7 and 8 are inactive and only the transmission lines 5 and 6 are active.

The card 2-1 inserted in the working card slot of the shelf 1 controls the relay 3-1 in accordance with the SLOT ID ("0"), the W/P signal ("W") and the R/N signal ("R"), such that the card 2-1 is connected to the transmission line 5 (or to the active input of the working card slot) by the relay 3-1 as indicated by the dotted line in FIG. 1. The card 2-2 inserted in the protection card slot of the shelf 1 controls the relay 3-2 in accordance with the SLOT ID ("1"), the W/P signal ("W") and the R/N signal ("R"), such that the card 2-2 is connected to the inactive transmission line 7 (or to the active input of the protection card slot) by the relay 3-2 as indicated by the dotted line in FIG. 1. The selector switch 4 is switched as indicated by the dotted line in FIG. 1 so as to connect the output of the card 2-1 to the output transmission line 6 and connect the output of the card 2-2 to the inactive transmission line 8. In this case, the card 2-1 becomes the working card, and the signal supplied via the transmission line 5 is processed by the card 2-1 and the processed signal is delivered from the card 2-1 to the output transmission line 6. The card 2-2 becomes the protection card because the transmission lines 7 and 8 are inactive.

In the transmission apparatus of the present invention, the selector switch 4 controls the connections between the outputs of the cards 2-1 and 2-2 and the output transmission lines 6 and 8. When the redundancy (R) configuration is used, the selector switch 4 is switched so as to connect one of the outputs of the card 2-1 and the card 2-2 to the output transmission line 6.

When the W/P signal is set to indicate the protection (P) line to be connected, the switching of the relays 3-1 and 3-2 of the cards 2-1 and 2-2 is changed from that of the relays 3-1 and 3-2 shown in FIG. 1. FIG. 2 shows an operation of the transmission apparatus of FIG. 1 when the W/P signal is set to indicate the protection (P) line to be connected in the case of the redundancy (R) configuration.

Figure 2:
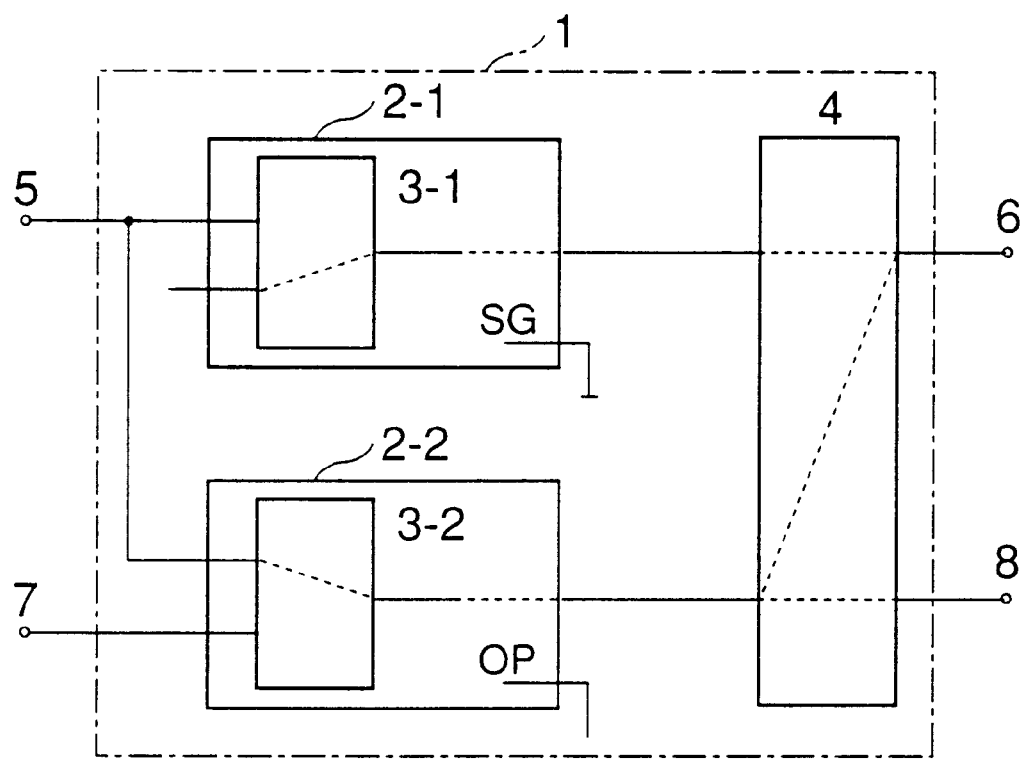
FIG. 2 is a diagram for explaining an operation of the transmission apparatus of FIG. 1 when a working/protection signal is set to indicate a protection line to be connected and a redundancy configuration is used.

As shown in FIG. 2, the card 2-1 inserted in the working card slot of the shelf 1 controls the relay 3-1 in accordance with the SLOT ID ("0"), the W/P signal ("P") and the R/N signal ("R"), such that the card 2-1 is disconnected from the transmission line 5 (or connected to the inactive input of the working card slot) by the relay 3-1 as indicated by the dotted line in FIG. 2. The card 2-2 inserted in the protection card slot of the shelf 1 controls the relay 3-2 in accordance with the SLOT ID ("1"), the W/P signal ("P") and the R/N signal ("R"), such that the card 2-2 is disconnected from the inactive transmission line 7 and connected to the transmission line 5 (or to the active input of the protection card slot) by the relay 3-2 as indicated by the dotted line in FIG. 2. The selector switch 4 is switched so as to connect the output of the card 2-2 to the output transmission line 6. In this case, the card 2-1 becomes the protection card because the W/P signal is set to indicate the protection line to be connected. The card 2-2 becomes the working card, and the signal supplied via the transmission line 5 is processed by the card 2-2 and the processed signal is delivered from the card 2-2 to the output transmission line 6.

By suitably setting the R/N signal and the W/P signal, the transmission apparatus of the present invention allows accurate setting of the line connections of the cards inserted in the shelf not only when the redundancy configuration is used but also when the non-redundancy configuration is used.

A description will now be given of the preferred embodiment of the present invention with reference to the accompanying drawings.

Figure 3:
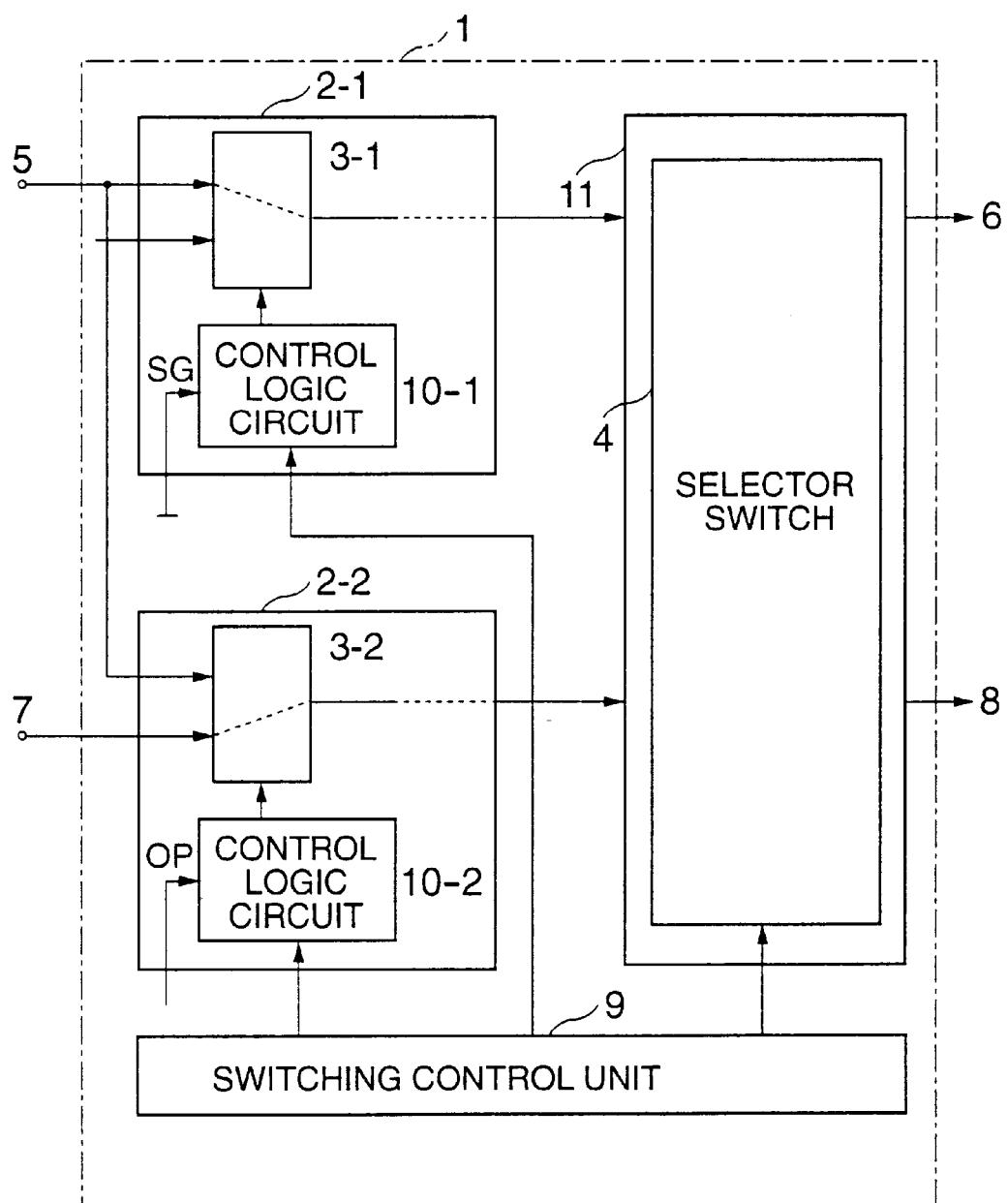
FIG. 3 is a block diagram of a transmission apparatus embodying the present invention.

FIG. 3 shows a transmission apparatus embodying the present invention. In FIG. 3, the elements which are essentially the same as corresponding elements in FIG. 1 are designated by the same reference numerals, and a description thereof will be omitted.

As shown in FIG. 3, the transmission apparatus of the present embodiment generally has the shelf 1, including at least the working card slot and the protection card slot, a switching control unit 9, and a multiplexer module 11. The card 2-1 inserted in the working card slot of the shelf 1 includes the relay 3-1 and a control logic circuit 10-1. The card 2-2 inserted in the protection card slot of the shelf 1 includes the relay 3-2 and a control logic circuit 10-2. The multiplexer module 11 includes the selector switch 4.

In the transmission apparatus of FIG. 3, the switching control unit 9 supplies the R/N signal and the W/P signal to each of the control logic circuit 10-1 and the control logic circuit 10-2. The switching control unit 9 also supplies a switching control signal to the selector switch 4 so as to control the line connections between the outputs of the cards 2-1 and 2-2 and the transmission lines 6 and 8. The grounded pin conductor (SG) of the working card slot of the shelf 1 supplies the SLOT ID (="0") to the control logic circuit 10-1 when the card 2-1 is inserted in the working card slot. The open-circuit pin conductor (OP) of the protection card slot of the shelf 1 supplies the SLOT ID (="1") to the control logic circuit 10-2 when the card 2-2 is inserted in the protection card slot. The control logic circuit 10-1 outputs a control signal depending on the SLOT ID, the R/N signal and the W/P signal, and the switching of the relay 3-1 is controlled by the control signal supplied by the control logic circuit 10-1. The control logic circuit 10-2 outputs a control signal depending on the SLOT ID, the R/N signal and the W/P signal, and the switching of the relay 3-2 is controlled by the control signal supplied by the control logic circuit 10-2.

In the transmission apparatus of FIG. 3, when the redundancy (R) configuration is used, the transmission lines 7 and 8 are inactive and only the transmission lines 5 and 6 are active. The control logic circuit 10-1 of the card 2-1, inserted in the working card slot of the shelf 1, receives the SLOT ID (="0"), the R/N signal ("R") and the W/P signal ("W"), and outputs the control signal to the relay 31. The relay 3-1 is switched by the control signal, as indicated by the dotted line in FIG. 3, such that the card 2-1 is connected to the transmission line 5 (or to the active input of the working card slot). The selector switch 4 is switched to connect the output of the card 2-1 to the transmission line 6.

Further, when the redundancy (R) configuration is used, the control logic circuit 10-2 of the card 2-2, inserted in the protection card slot of the shelf 1, receives the SLOT ID (="1"), the R/N signal ("R") and the W/P signal ("W"), and outputs the control signal to the relay 3-2. The relay 3-2 is switched by the control signal, as indicated by the dotted line in FIG. 3, such that the card 2-2 is connected to the inactive transmission line 7 (or to the active input of the protection card slot) by the relay 3-2. The selector switch 4 is switched to connect the output of the card 2-2 to connect the output of the card 2-2 to the inactive transmission line 8 (or to set the output of the card 2-2 in an open condition). In this case, the card 2-1 becomes the working card, and the signal supplied via the transmission line 5 is processed by the card 2-1 and the processed signal is delivered from the card 2-1 to the output transmission line 6. The card 2-2 becomes the protection card because the transmission lines 7 and 8 are inactive.

Further, by suitably setting the R/N signal and the W/P signal supplied to the control logic circuits 10-1 and 10-2, the transmission apparatus of the present embodiment allows accurate setting of the line connections of the cards inserted in the shelf not only when the redundancy configuration is used but also when the non-redundancy configuration is used. For example, when the W/P signal is set to indicate the protection line to be connected, the relay 3-1 of the card 2-1 is switched by the control signal supplied by the control logic circuit 10-1, so as to connect the card 2-1 to the inactive input of the working card slot. At the same time, the relay 3-2 of the card 2-2 is switched by the control signal supplied by the control logic circuit 10-2, so as to connect the card 2-2 to the transmission line 5 (or to the active input of the protection card slot). The selector switch 4 is switched to connect the output of the card 2-2 to the output transmission line 6. Hence, the card 2-1 is changed into the protection card and the card 2-2 is changed into the working card when the W/P signal is set to indicate the protection line to be connected.

Figure 4:
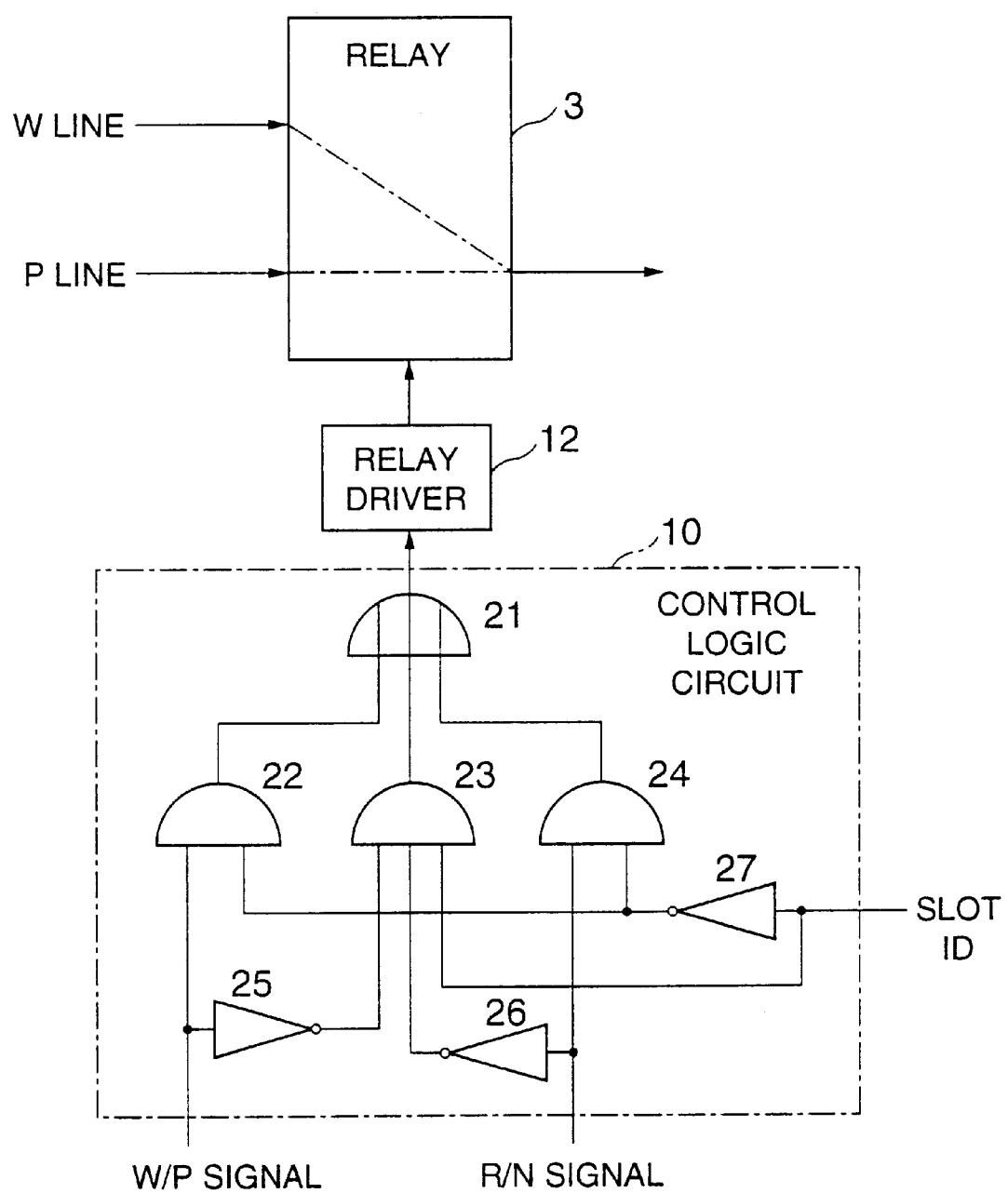
FIG. 4 is a block diagram of a control logic circuit in the transmission apparatus of the embodiment of FIG. 3.
Figure 6:
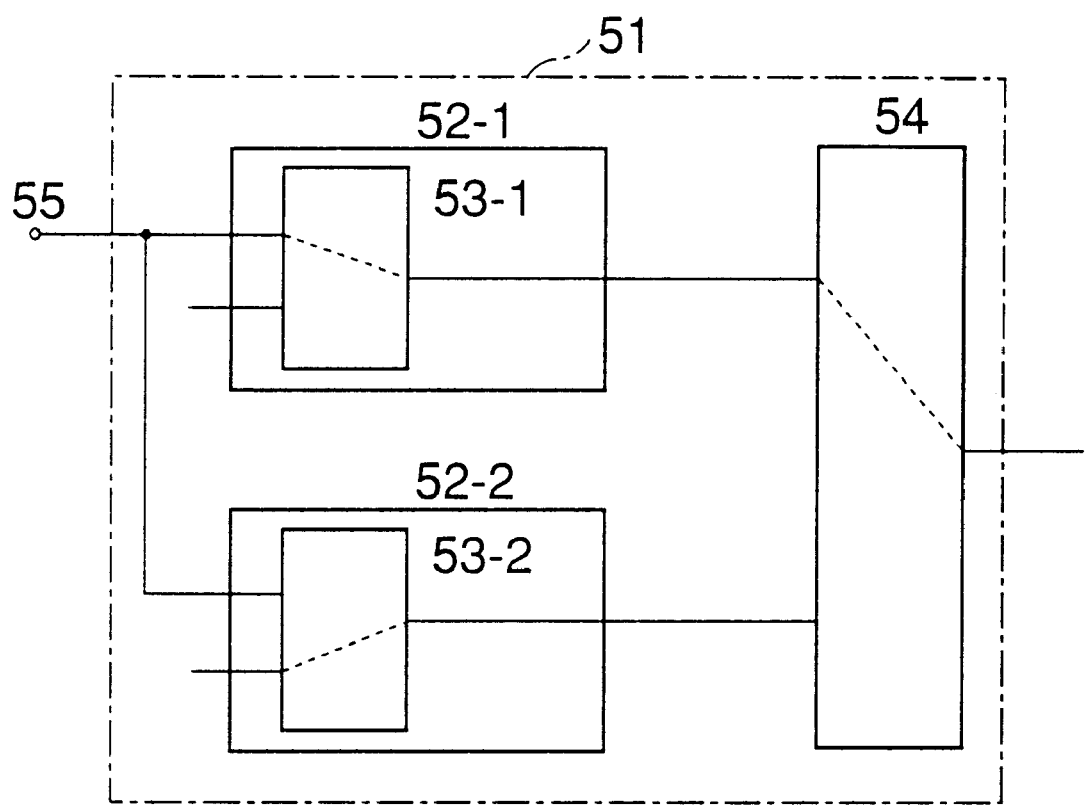
FIG. 6 is a diagram for explaining an operation of a conventional transmission apparatus with a working card connected to a transmission line.
Figure 7:
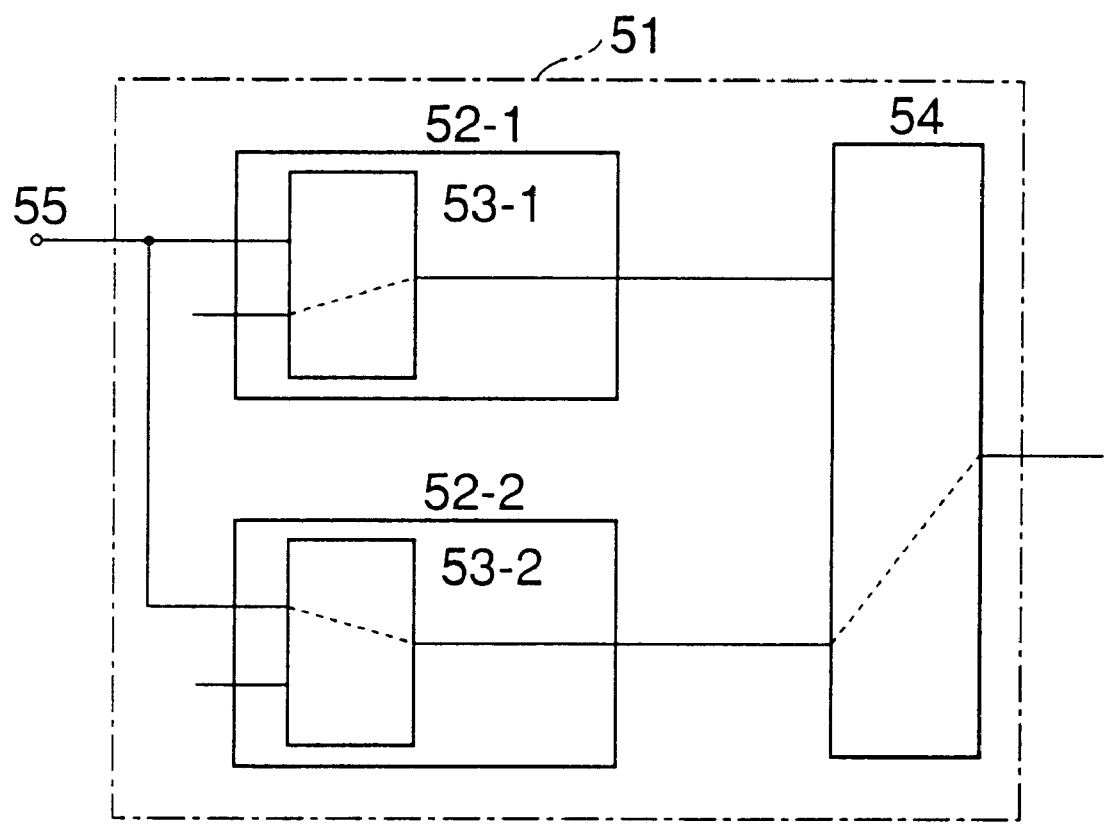
FIG. 7 is a diagram for explaining an operation of the conventional transmission apparatus with a protection card connected to the transmission line.

FIG. 4 shows a control logic circuit 10 in the transmission apparatus of the embodiment of FIG. 3.

In the present embodiment, the control logic circuit 10 outputs a control signal to a line connection relay 3 via a relay driver 12. The control logic circuit 10, the relay driver 12 and the line connection relay 3 are provided within each of the card 2-1 and the card 2-2 of the transmission apparatus of FIG. 3.

As shown in FIG. 4, an OR gate 21, three AND gates 22, 23 and 24, and three inverters 25, 26 and 27 are provided in the control logic circuit 10. The R/N signal is supplied to each of an input of the inverter 26 and an input of the AND gate 24. The W/P signal is supplied to each of an input of the inverter 25 and an input of the AND gate 22. The SLOT ID is supplied to each of an input of the inverter 27 and an input of the AND gate 23.

The W/P signal indicates which of the working line and the protection line is to be connected to the output of the card inserted. In the present embodiment, when the W/P signal is set to "1", it indicates that the working line is to be connected to the output of the inserted card, and when the W/P signal is set to "0", it indicates that the protection line is to be connected to the output of the inserted card.

The SLOT ID indicates the kind of the card slot (either the working card slot or the protection card slot of the shelf 1) into which the related card (2-1 or 2-2) containing the control logic circuit 10 is inserted. In the present embodiment, when the related card is inserted into the working card slot of the shelf 1, the control logic circuit 10 is connected at its SLOT ID input to the pin conductor (SG) of the working card slot which is grounded. The SLOT ID in this case is set to "0", and the control logic circuit 10 receives this SLOT ID. When the related card is inserted into the protection card slot of the shelf 1, the control logic circuit 10 is connected at its SLOT ID input to the pin conductor (OP) of the protection card slot which is in an open-circuit condition. The SLOT ID in this case is set to "1", and the control logic circuit 10 receives this SLOT ID.

The R/N signal indicates which of the redundancy (R) configuration and the non-redundancy (N) configuration is to be used by the shelf 1. In the present embodiment, when the R/N signal is set to "0", it indicates that the redundancy (R) configuration is to be used by the shelf 1. When the R/N signal is set to "1", it indicates that the non-redundancy (N) configuration is to be used by the shelf 1.

The control logic circuit 10 outputs a control signal (ON/OFF) depending on which of eight (=$2^3$) possible values "000" to "111" is indicated by the setting signals W/P, R/N and SLOT ID input to the control logic circuit 10. The control signal output by the control logic circuit 10 is supplied through the relay driver 12 to the line connection relay 3. The line connection relay 3 serves to connect either the working line or the protection line to the output of the inserted card in accordance with the control signal ON/OFF supplied by the control logic circuit 10. The relay driver 12 serves to provide current to a coil of the relay 3 when the control signal ON is supplied by the control logic circuit 10. The current flowing through the coil of the relay 3 causes a magnetic field that attracts an armature of the relay 3, so as to connect the working line to the output of the related card and disconnect the protection line from the output of the related card. On the other hand, when the control signal OFF is supplied by the control logic circuit 10, the relay driver 12 does not act to provide current to the coil of the relay 3. In this case, the protection line is connected to the output of the related card with the working line being disconnected.

Suppose that the shelf 1 is set in the redundancy configuration with the W/P signal being set to "1" (which indicates the working line should be connected). The line connection relay 3 of the card inserted in the working card slot of the shelf 1 serves to connect the working line to the output of the related card. This card acts as the working card which is active in the shelf 1 of the redundancy configuration. The line connection relay 3 of the other card inserted in the protection card slot of the shelf 1 serves to connect the protection line to the output of the related card. This card acts as the protection card which is inactive in the shelf 1 of the redundancy configuration.

Further, suppose that, in the case of the above-mentioned shelf 1, the W/P signal is now set to "0" (which indicates the protection line should be connected). The relay 3 of the card inserted in the working card slot of the shelf 1 serves to connect the protection line to the output of the related card with the working line being disconnected. This card is turned into the protection card which is inactive in the shelf 1 of the redundancy configuration. The relay 3 of the other card inserted in the protection card slot of the shelf 1 serves to connect the working line to the output of the related card with the protection line being disconnected. This card is turned into the working card which is active in the shelf 1 of the redundancy configuration.

The control logic circuit 10 of the transmission apparatus of the present invention may be constructed in a different configuration than that of FIG. 4. The functions of the control logic circuit 10 may be achieved by using a processor with arithmetic computation functions instead of the control logic circuit 10 of FIG. 4.

FIG. 5 shows a relationship between the setting signals R/N, W/P and SLOT ID input to the control logic circuit 10 and the control signal output by the control logic circuit 10.

As shown in FIG. 5, the R/N signal is set to "0" when the redundancy (R) configuration is to be used by the shelf 1, and the R/N signal is set to "1" when the non-redundancy (N) configuration is to be used by the shelf 1. The W/P signal is set to "1" when the working (W) line is to be connected to the output of the related card, and the W/P signal is set to "0" when the protection (P) line is to be connected to the output of the related card. The SLOT ID is set to "0" when the card is inserted into the working card slot of the shelf 1, and the SLOT ID is set to "1" when the card is inserted into the protection card slot of the shelf 1.

Further, as shown in FIG. 5, the control signal, which is output to the relay 3 by the control logic circuit 10, is set to ON state when the relay 3 should connect the working line to the output of the related card. The control signal is set to OFF state when the relay 3 should connect the protection line to the output of the related card.

Suppose that the shelf 1 is set in the non-redundancy configuration (the R/N signal="1") with the W/P signal being set to "1" (which indicates the working line should be connected) and the SLOT ID being set to "0" (which indicates the related card is inserted into the working card slot). In this case, in the control logic circuit 10 of FIG. 4, each of the AND gate 22 and the AND gate 24 outputs an ON-state signal ("1") to the OR gate 21, and the AND gate 23 outputs an OFF-state signal ("0") to the OR gate 21. The OR gate 21 outputs an ON-state control signal ("1") to the relay 3 via the relay driver 12. As indicated in FIG. 5, in this case, the relay 3 of the card 2-1 serves to connect the working line to the output of the card 2-1 in accordance with the ON-state control signal supplied by the control logic circuit 10.

If the W/P signal is turned into "0" (which indicates the protection line should be connected) in the above-mentioned case, the relay 3 remains unchanged, and serves to connect the working line to the output of the related card in accordance with the ON-state control signal supplied by the control logic circuit 10, as indicated in FIG. 5. With the shelf 1 being set in the non-redundancy configuration (the R/N signal="1"), the relay 3 of the card inserted in the working card slot (the SLOT ID="0") always serves to connect the working line to the output of the related card (the control signal ON) regardless of whether the W/P signal is set to "1" or With the shelf 1 being set in the non-redundancy configuration (the R/N signal="1"), the relay 3 of the card inserted in the protection card slot (the SLOT ID="1") always serves to connect the protection line to the output of the related card (the control signal OFF) regardless of whether the W/P signal is set to "1" or "0". Hence, with the shelf 1 being set in the non-redundancy configuration, the transmission apparatus of the present embodiment acts to connect the working line to the output of the card inserted in the working card slot and to connect the protection line to the output of the card inserted in the protection card slot as shown in FIG. 1. The transmission apparatus of the present embodiment is effective in eliminating the increase in the number of vacant slots for the protection cards in the shelf 1 in the case of the non-redundancy configuration. Thus, it is possible to effectively of the card slots of the shelf 1 even when it is set in the non-redundancy configuration. The parallel processing of data signals supplied via the transmission lines 5 and 7 is always possible by the respective cards inserted in the shelf 1 in the non-redundancy configuration.

Further, suppose that the shelf 1 is set in the redundancy configuration (the R/N signal="0") with the W/P signal being set to "1" (which indicates the working line should be connected) and the SLOT ID being set to "0" (which indicates the related card is inserted into the working card slot). In this case, the control logic circuit 10 outputs the ON-state control signal ("1") to the relay 3 via the relay driver 12. As indicated in FIG. 5, in this case, the relay 3 of the card inserted in the working card slot serves to connect the working line to the output of the relay 3 in accordance with the ON-state control signal supplied by the control logic circuit 10.

If the W/P signal is turned into "0" (which indicates the protection line should be connected) in the above-mentioned case, the control logic circuit 10 outputs the OFF-state control signal ("0") to the relay 3 via the relay driver 12 as indicated in FIG. 5. The relay 3 of the card inserted in the working card slot serves to connect the protection line to the output of the relay 3 with the working line being disconnected, in accordance with the OFF-state control signal supplied by the control logic circuit 10. As the protection line is inactive, this card is turned into the protection card which is inactive in the shelf 1 of the redundancy configuration.

The relay 3 of the card inserted in the protection card slot of the shelf 1 in the redundancy configuration (the R/N signal="0", the SLOT ID="1", the W/P signal="1") serves to connect the protection line to the output of the relay 3 with the working line being disconnected (the control signal OFF). This card acts as the protection card which is inactive in the shelf 1 of the redundancy configuration. In this case, the card inserted in the working card slot acts as the working card which is active in the shelf 1 of the redundance configuration.

If the W/P signal is set to "0" in the above-mentioned case, the control logic circuit 10 outputs the ON-state control signal ("1") to the relay 3 as indicated in FIG. 5. The relay 3 of the card inserted in the protection card slot serves to connect the working line to the output of the relay 3 with the protection line being disconnected, in accordance with the ON-state control signal supplied by the control logic circuit 10. This card acts as the working card which is active in the shelf 1 of the redundancy configuration. In this case, the card inserted in the working card slot is turned into the protection card which is inactive in the shelf 1 of the redundancy configuration.

With the shelf 1 being set in the redundancy configuration (the RIN signal="0"), the relay 3 of the card inserted in the working card slot serves to selectively connect the working line or the protection line to the output of that relay 3, depending on whether the W/P signal is set to "1" or "0". In parallel to the operation of the abovementioned relay 3, the relay 3 of the card inserted in the protection card slot serves to selectively connect the protection line or the working line to the output of that relay 3, depending on whether the W/P signal is set to "1" or "0". The operation of the abovementioned relay 3 in the transmission apparatus of the present invention may be achieved by using an existing switching device, such as a transistor. Similarly, the operation of the selector switch 4 in the transmission apparatus of the present invention may be achieved by using an existing switching device, such as a transistor.

Accordingly, with the shelf 1 being set in the redundancy configuration, the transmission apparatus of the present embodiment acts to selectively connect the working line or the protection line to the output of the relay 3 of the card inserted in the working card slot depending on the value of the W/P signal, and to selectively connect the protection line or the working line to the output of the relay 3 of the card inserted in the protection card slot depending on the value of the W/P signal. Therefore, the transmission apparatus of the present embodiment is effective in preventing erroneous setting of the line connections of the cards inserted in the shelf 1 when it is set in the redundancy configuration. It is possible to provide good reliability of communications without causing the erroneous setting of the line connections of the cards inserted in the shelf 1 of the redundancy configuration.

The present invention is not limited to the above-described embodiments, and variations and modifications may be made without departing from the scope of the present invention.

Further, the present invention is based on Japanese priority application No. 11-039,383, filed on Feb. 18, 1999, the entire contents of which are hereby incorporated by reference.

What is claimed is:

1. A transmission apparatus in which a plurality of cards are inserted into a plurality of card slots, comprising:
   a shelf including a working card slot and a protection card slot, the working card slot supplying a first slot ID to a first card inserted in the working card slot, and the protection card slot supplying a second slot ID to a second card inserted in the protection card slot;
   a control logic circuit, provided within each of the first and second cards, which receives one of the first slot ID or the second slot ID, a redundancy/non-redundancy R/N signal and a working/protection W/P signal, and outputs a control signal depending on the related slot ID, the R/N signal and the W/P signal; and
   a line connection relay, provided within each of the first and second cards, which connects either a working line or a protection line to an output of the related card in accordance with the control signal supplied by the control logic circuit.

2. The transmission apparatus according to claim 1, wherein, when the R/N signal is set to indicate a redundancy configuration and the W/P signal is set to indicate the protection line, the relay of the first card connects the protection line to the output of the first card, the protection line being connected to an inactive input of the working card slot, and when the R/N signal is set to indicate a non-redundancy configuration with the W/P signal unchanged, the relay of the first card connects the working line to the output of the first card, the working line being connected to an input transmission line of the shelf.

3. The transmission apparatus according to claim 1, wherein, when the R/N signal is set to indicate a non-redundancy configuration, the control logic circuits of the first and second cards control the line connection of the corresponding relay by the corresponding slot ID, such that the relay of the first card connects the working line to the output of the first card regardless of the W/P signal, and the relay of the second card connects the protection line to the output of the second card regardless of the W/P signal.

4. The transmission apparatus according to claim 1, wherein, when the R/N signal is set to indicate a redundancy configuration and the W/P signal is set to indicate the working line, the relay of the second card connects the protection line to the output of the second card, said protection line being inactive to an input transmission line of the shelf, and when the R/N signal is set to indicate a non-redundancy configuration with the W/P signal unchanged, the relay of the second card remains unchanged to connect the protection line to the output of the second card.

5. The transmission apparatus according to claim 1, wherein, when the R/N signal is set to indicate a redundancy configuration and the W/P signal is set to indicate the protection line, the relay of the second card connects the working line to the output of the second card, the working line being connected to a first transmission line of the shelf, and when the R/N signal is set to indicate a non-redundancy configuration with the W/P signal unchanged, the relay of the second card connects the protection line to the output of the second card, the protection line being connected to a second transmission line of the shelf.

6. The transmission apparatus according to claim 1, wherein, when the R/N signal is set to indicate a redundancy configuration and the W/P signal is set to indicate the working line, the relay of the first card connects the working line to the output of the first card, the working line being connected to a first transmission line of the shelf, and when the R/N signal is set to indicate a non-redundancy configuration with the W/P signal unchanged, the relay of the first card connects the working line to the output of the first card.

7. The transmission apparatus according to claim 1, wherein the first card, inserted in the working card slot, processes a signal supplied via an input transmission line, the working line of the first card connected to the input transmission line via the relay, the processed signal from an output of the first card being delivered to an output transmission line.

8. The transmission apparatus according to claim 1, wherein a first transmission line is connected to both an active input of the working card slot of the shelf and an inactive input of the protection card slot of the shelf, an inactive input of the working card slot is connected to no transmission line, and a second transmission line is connected to an active input of the protection card slot.

\* \* \* \* \*